April 18, 1950     W. P. ALBERT     2,504,613
MOTOR CONTROL SYSTEM
Filed Sept. 15, 1943
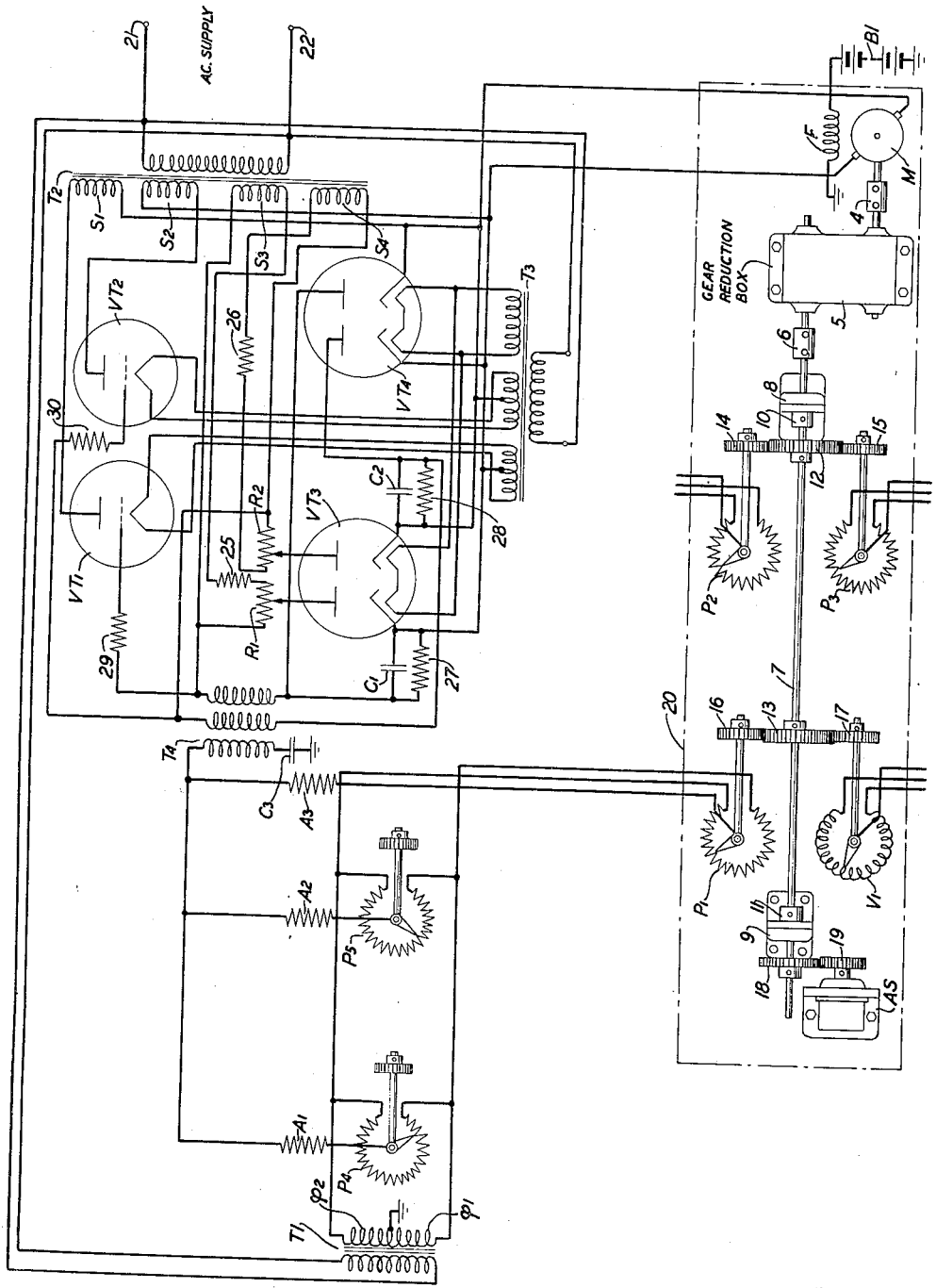
INVENTOR
W.P. ALBERT
BY
P.C. Smith
ATTORNEY Patented Apr. 18, 1950

2,504,613

UNITED STATES PATENT OFFICE 2,504,613

MOTOR CONTROL SYSTEM

Walter P. Albert, Madison, N. J., assignor to Bell Telephone Laboratories, Incorporated, New York, N. Y., a corporation of New York Application September 15, 1943, Serial No. 502,485

7 Claims. (Cl. 318—345)

This invention relates to control systems and more particularly to aircraft trainers whereby, in response to electrical changes imposed upon some of the circuits in response to flight or other controls of the trainer in simulation of the operation of an aircraft, electrical changes are imposed upon other circuits of the trainer.

It is an object of the present invention to provide a control system adaptable to aircraft trainers, although capable of general use, wherein a reversible direct current motor, operable to control the setting of indicators, variable potentiometers, variable autotransformers or other control devices, is operated by alternating current potentials to maintain the angular settings of such devices in the exact positions dictated by the settings of remotely located controlling elements.

Another object of the invention is to provide a motor control system wherein there is an automatic regulation of the speed of the motor in response to the back electromotive force generated by the motor.

A further object of the invention is to provide a motor control system in which the motor is driven in one or the other direction under the control of a shift of phase in an alternating current potential applied to the grids of two gas-filled tubes and in which the cross-firing of such tubes in response to the generation of back electromotive force by the motor is prevented.

A further object of the invention is to provide a motor control circuit in which the false operation of the tubes in response to a slight out-of-phase relationship between the signal source of alternating source applied to the grids of the tubes and the alternating current applied to the anodes of the tubes is also prevented.

A further object of the invention is to prevent or minimize the false operation of the tubes in response to harmonics of the signal current. This provides a more sensitive circuit for the signal.

The foregoing objects and others appertinent thereto are accomplished by providing two gas-filled tubes, a dual rectifier tube with a condenser and bridged resistance associated with each unit thereof for supplying rectified biasing potential to the grids of the gas-filled tubes, and a dual rectifier tube, the two units of which are reversely bridged in series with the resistances across the rotor circuit of the direct current motor. Both of the gas-filled tubes are supplied with anode potential from secondary windings of a transformer supplied from an alternating current source in such a manner that one of the tubes is responsive only to one phase unbalance of a network supplied by alternating current potential from one or more control elements to establish the rotor circuit of the motor upon each cycle of the alternating current to drive the motor in one direction of rotation, and the second tube is responsive only to the opposite phase unbalance of the network to establish the rotor circuit of the motor upon each cycle of alternating current to drive the motor in the other direction of rotation.

The charging of the condensers through the first dual rectifier tube by the positive half cycles of alternating current supplied from other secondary windings of the supply transformer is effective to apply a negative bias to the grids of the gas-filled tubes with respect to their cathodes so as to normally prevent the firing of either tube by the anode potential supplied from the secondary windings of the same transformer when no signal is being received. Also the additional positive charge supplied to these condensers by a positive harmonic of the incoming signal will increase the negative grid-to-cathode bias so as to effectively prevent the false operation of a tube by a subsequent positive harmonic acting as a signal. In addition, when a signal causes one of the gas-filled tubes to operate, the positive charge on the condenser associated with the tube not being fired is increased so that the negative grid-to-cathode bias of this second tube is further increased to insure that it cannot falsely fire in response to the increase of its anode potential by the counter-electromotive force generated by the motor.

The second dual rectifying tube is effective to selectively apply the back electromotive force generated by the motor to the resistance included in the input circuit of one or the other of the gas-filled tubes depending upon which tube is effective to operate the motor, whereby the counter-electromotive force generated by the motor is made to oppose the signal incoming to such tube so as to automatically regulate the speed of the motor and to thereby prevent the motor from attaining a speed greater than would be commensurate with that indicated by the incoming signal potential.

The novel features of the invention are set forth in the appended claims and the invention as to its organization and its mode of operation will be best understood from the following detailed description when read in connection with the single sheet of the drawing.

In the drawing the motor M, potentiometers

P1, P2, P3, P4 and P5 and variable autotransformer V1, for clarity of disclosure, have been illustrated schematically as disclosed in a plane at right angles to their associated operating shafts. The motor M is provided with a stator or field winding F which is excited from the source B1 of direct current. The stator could be a permanent magnet in which case no field winding would be required. The motor has an armature or rotor which is supplied with current from the secondary windings S1 and S2 of the transformer T2, rectified by the gas-filled tubes VT1 and VT2.

The rotor shaft of the motor is coupled by a coupling 4 to the driving shaft of the reduction gear box 5, the driven shaft of which is connected by a second coupling 6 to a shaft 7 which is journaled in the bearings 8 and 9. To prevent axial movement of the shaft 7 with respect to the bearings, collars 10 and 11 are secured by screws to the shaft adjacent to the bearings. Secured at convenient positions along the shaft are a plurality of gears 12, 13, etc. which are effective to drive the brush shafts of variable potentiometers, such as P1, P2 and P3, or of variable autotransformers, such as V1. For this purpose the brush shaft of each potentiometer or autotransformer is provided with a gear, such as gears 14, 15, 16, 17, etc., meshed with the gears 12 and 13.

The shaft 7 may also be effective to drive a synchro-generator such as AS through the gear 18 secured to the shaft 7 and the gear 19 secured to the rotor shaft of the generator.

The motor M, gear reduction box 5, potentiometers, variable autotransformers, synchro-generators AS and bearings 8 and 9 for the shaft 7, may be secured to a suitable mounting plate 20.

For controlling the motor M, two triode gas-filled tubes VT1 and VT2 are provided. Alternating current potential is supplied to the anode of tube VT1 through the secondary winding S1 of transformer T2, the right primary winding of which is supplied with potential from the source of alternating current AC connected between terminals 21 and 22. Alternating current potential of opposite polarity is supplied to the anode of tube VT2 through the secondary winding S2 of transformer T2. It is to be noted that the windings S1 and S2 of the transformer T2 are oppositely poled so that any instant the potentials applied to the anodes of tubes VT1 and VT2 will be opposite in polarity. The filaments of tubes VT1 and VT2 are heated by current supplied thereto from the left and middle secondary windings of power transformer T3, the primary winding of which is energized from the source of alternating current connected between the terminals 21 and 22.

For furnishing normal negative grid biasing potential for tubes VT1, VT2 when no signal is received, the input potentials being balanced and the motor not running, a dual rectifier tube VT3 is provided, together with the associated rheostats R1 and R2, resistances 27 and 8, and condensers C1 and C2. The winding of rheostat R1 is bridged in series with the resistance 25 across the secondary winding S3 of transformer T2 and a rectified potential is derived therefrom which is applied between the grid and cathode (middle of filament) of tube VT1 as a biasing potential over a path which may be traced from the grid through resistance 29, winding of rheostat R1 and the slider thereof, over the anode-cathode path through the left unit of tube VT3 to the mid-point of the left secondary winding of transformer T3 which supplies filament heating current to the tube VT1. The secondary windings S1 and S3 are poled oppositely so that the slider of rheostat R1 is positive when the anode of tube VT1 is negative.

This positive potential at the slider of rheostat R1 with respect to the left end of the rheostat winding R1 which is connected to the then negative or opposite terminal of the secondary winding S3 is impressed across the anode-cathode path through the tube VT3 in series with the condenser C1 and the right secondary winding of the input transformer T4 to the left terminal of the winding of rheostat R1. The condenser C1 thus becomes charged to this relatively low potential (4 to 6 volts) and the charge is trapped on the condenser for, when the alternating current impressed on the secondary winding S3 reverses the tube VT3 will not conduct in the reverse direction. Hence the charge from condenser C1 is dissipated across the resistance 27 so that the terminal connected to the secondary winding of input transformer T4 and thence to the grid of tube VT1 is negative and the other terminal of resistance 27 connected to the cathode of tube VT1 is positive. Since resistance 27 is relatively high, thus providing a high time constant for the discharge of condenser C1, a direct current potential is maintained across resistance 27 near its maximum until the middle of the next half cycle of the alternating current at which time the other winding S1 of transformer T2 will attempt to break down the cathode-anode circuit of tube VT1 the anode of which is now positive. However, the slider of rheostat R1 is adjusted so that the negative bias still present on the grid of tube VT1 from resistance 27 will just prevent the breakdown of the cathode-anode circuit.

Similarly, the winding of rheostat R2 is bridged in series with the resistance 26 across the secondary winding S4 of transformer T2 and a rectified potential is derived therefrom which is applied between the grid and cathode (middle of filament) of tube VT2 as a biasing potential over a path which may be traced from the grid through resistance 30, winding of rheostat R2 and slider thereof, over the anode-cathode path through the right unit of tube VT3 to the mid-point of the middle secondary winding of transformer T3 which supplies filament heating current to the tube VT2. The secondary windings S2 and S4 are poled oppositely so that the slider of rheostat R2 is positive when the anode of tube VT2 is negative.

This positive potential at the slider of rheostat R2 with respect to the right end of the rheostat winding R2 which is connected to the then negative or opposite terminal of the secondary winding S4 is impressed across the anode-cathode path through the tube VT3 in series with condenser C2 and the middle secondary winding of input transformer T4 to the right terminal of the winding of rheostat R2. The condenser C2 thus becomes charged to the relatively low potential (4 to 6 volts) and the charge is trapped on the condenser for, when the alternating current impressed on the secondary winding S4 reverses, tube VT3 will not conduct in the reverse direction hence the charge from condenser C2 is dissipated across resistance 28 so that the terminal connected to the secondary winding of input transformer T4 and thence to the grid of tube VT2 is negative and the other terminal of resistance 28 connected to the cathode of tube VT2 is positive. Since resistance 28 is relatively high, thus providing a high time constant for the discharge of condenser C2, a direct current potential is maintained across resistance 28 near its maximum until the middle of the next half cycle of the alternating current at which time the other winding S2 of transformer T2 will attempt to break down the cathode-anode circuit of tube VT2 the anode of which is now positive. However, the slider of rheostat R2 is adjusted so that the negative bias still present on the grid of tube VT2 from resistance 28 will just prevent the breakdown of the cathode-anode circuit.

The rotor winding of the motor M is connected in series with the secondary winding S1 of transformer T2 over the cathode-anode path through tube VT1 whereby the motor is driven in one direction of rotation when the tube VT1 is conducting in response to an incoming signal of one phase, and when the motor is thus operated the counter-electromotive force generated thereby is applied through resistance 27 across the anode-cathode path of the right unit of rectifier tube VT4. Also the rotor winding is connected in series with the secondary winding S2 of transformer T2 over the cathode-anode path through tube VT2 whereby the motor is driven in the other direction of rotation when the tube VT2 is conducting in response to an incoming signal of the opposite phase, and when the motor is thus operated the counter-electromotive force generated thereby is applied through the resistance 28 and across the anode-cathode path of the left unit of rectifier tube VT4. The filaments of both tubes VT3 and VT4 are heated by current applied thereto over the right secondary winding of power transformer T3.

It will be assumed that the motor is to be rendered responsive to potential applied from potentiometers or variable autotransformers operated by the motors of other similar motor control circuits or operated under manual control. Potentiometers P4 and P5 driven by the motor shafts of two other motor control circuits have been illustrated. The windings of these potentiometers are energized from the same source of alternating current connected between terminals 21 and 22 and applied through the transformer T1 or the primary winding of transformer T1 may be connected to another source of alternating current phased the same as the source connected between terminals 21 and 22. The secondary winding of transformer T1 has its midpoint connected to ground and therefore potentials 180 degrees apart in phase, $\phi 1$ and $\phi 2$, are simultaneously applied to the end terminals of the potentiometers P4 and P5.

The brushes of the potentiometers P4 and P5 are connected through resistances A1 and A2 to the upper terminal of the primary winding of input transformer T4 and the brush of balancing potentiometer P1 is connected through resistance A3 to the upper terminal of the primary winding of transformer T4. When any potentiometer brush is so positioned as to engage the central point of its winding no potential will be applied from the secondary winding of transformer T1 over such brush to the primary winding of transformer T4.

It will be assumed that the brushes of potentiometers P4, P5 and P1 are so set that the motor control circuit is in balance and that therefore no input potential is applied from the primary winding of input transformer T4 to the secondary windings thereof. Under this condition the motor M is at rest and neither tube VT1 or VT2 is conductive and a normal negative grid bias is applied to the grids of tubes VT1 and VT2 in the manner previously described. It will now be assumed that the brushes of one or both of the potentiometers P4 and P5 are moved in a counter-clockwise direction towards the lower end terminals of their respective windings to indicate to the motor control circuit disclosed, that changes have occurred in the control circuits with which the potentiometers P4 and P5 are associated.

At a given instant potential of phase $\phi 1$ will be impressed upon the circuit extending from ground through the lower portion of the secondary winding of transformer T1, over the lower portion of the winding of potentiometer P4 and the brush thereof, through resistance A1, through the primary winding of input transformer T4 and through condenser C3 to ground and, at the same instant, potential of the opposite phase $\phi 2$ will be impressed upon the circuit extending over the upper portion of the secondary winding of transformer T1, over the upper portion of the winding of potentiometer P4 and the brush thereof and thence as traced to ground through the primary winding of transformer T4. These potentials being of opposite phase will tend to balance each other but due to the position of the brush of potentiometer P4 the potential of phase $\phi 1$ will predominate. Potential of phase $\phi 1$ will also be impressed upon the circuits extending from ground through the lower portion of the secondary winding of the transformer T1, over the lower portion of the winding of potentiometer P5 and the brush thereof, through resistance A2 and thence as traced to ground through the primary winding of transformer T3 and, at the same instant, potential of the opposite phase $\phi 2$ will be impressed upon the circuit extending over the upper portion of the secondary winding of transformer T1, over the upper portion of the winding of potentiometer P5 and the brush thereof, through resistance A2 and thence as traced to ground through the primary winding of transformer T4. These potentials being of opposite phase will also tend to balance each other but due to the position of the brush of potentiometer P5 the potential of phase $\phi 1$ will predominate.

As a consequence the predominating potentials of phase $\phi 1$ are added at the primary winding of transformer T4, resulting in the impression of a potential upon the two secondary windings of this transformer. During the positive half cycles of the signaling current, impulses of negative potential will be applied to the grids of tubes VT1 and VT2 and during the negative half cycles impulses of positive potential will be applied to the grids of these tubes.

It will be assumed that an incoming signal is received whereupon during the half cycles when positive potentials are impressed upon the secondary windings of transformer T4, the impulses of positive potential applied to the grids of tubes VT1 and VT2 are high enough in value to render the potentials of the grids sufficiently less negative or more positive to cause the tube VT1 to become conducting since at those instants the potential impressed upon its anode through the secondary winding S1 of transformer T2 is also positive. Tube VT2, however, will not become conducting since at those instants the potential impressed upon its anode through the secondary winding S2 of transformer T2 is negative. The positive potential impulses generated in the secondaries of transformer T4 are also effective to cause an increase in the charges on condensers C1 and C2 commensurate with the potential value of the incoming signal. Condenser C1 is charged over a path extending through the left portion of rheostat R1 and the slider thereof, over the anode-cathode path through the left unit of rectifier tube VT3, through condenser C1 and through the right secondary winding of transformer T4, and condenser C2 is charged over a path extending through the right portion of rheostat R2 and the slider thereof, over the anode-cathode path through the right unit of tube VT3, through condenser C2 and through the middle secondary winding of transformer T4. The condensers will therefore attain charges equal to the normal biasing potential plus the signal potential.

With tube VT1 now conducting a circuit is established through the secondary winding S1 of transformer T2, over the anode-filament path through the tube VT1, over the filament heating circuit of the tube to the mid-point of the left secondary winding of transformer T3 through the rotor winding of motor M and returning to the left secondary winding of transformer T2 and, since the stator or field winding F of motor M is at the time energized from the direct current source B1, the motor is caused to operate in one direction of rotation in response to the alternating current impulses as rectified by the tube VT1 and at a speed commensurate with the potential value of the incoming signal. As the motor operates it transmits power through the reduction gear box 5 to the shaft 7 which turns at a slow speed and in turn rotates the brushes of the variable potentiometers P1, P2 and P3 and the brush of the variable autotransformer V1 and causes the rotation of the rotor of the synchrogenerator AS in a clockwise direction. The shaft of the potentiometer P1 is so geared to the shaft 7 that the brush of such potentiometer will be moved by the rotation of shaft 7 towards the upper terminal of its winding.

Potential of phase $\phi 2$ will now be impressed upon a circuit which may be traced from ground over the upper portion of the secondary winding of transformer T1, over the upper portion of the winding of potentiometer P1 and the brush thereof, through resistance A3, the primary winding of input transformer T4 and condenser C3 to ground and, at the same instant, potential of phase $\phi 1$ will be impressed upon a circuit which may be traced from ground over the lower portion of the secondary winding of transformer T1, over the lower portion of the winding of potentiometer P1 and the brush thereof, through resistance A3 and thence as traced through the primary winding of transformer T4. These potentials being of opposite phase will tend to balance each other but due to the position of the brush of potentiometer P1, the potential of phase $\phi 2$ will predominate. As the motor M rotates the brush of potentiometer P1 is moved toward its upper winding terminal and the predominant potential of phase $\phi 2$ impressed through resistance A3 upon the primary winding of transformer T4 will be increased until it reaches a value which is equal but opposite in phase to the sum of the potentials of phase $\phi 1$ impressed through the resistances A1 and A2 upon the primary winding of transformer T4. As the value of the balancing potential increases the positive potential applied to the grid of tube VT1 decreases resulting in a diminution in the rate of firing of tube VT1 and a reduction in the speed of the motor M until when the brush of potentiometer P1 has been moved to a point where the potential applied thereover through the primary winding of transformer T4 balances the potential applied through such primary winding over the brushes of potentiometers P4 and P5, the motor will come to rest.

To insure that the motor M will not attain a speed higher than that commensurate with the potential of the incoming signal the rectifier tube VT4 is provided to serve as a part of an automatic speed regulating circuit.

So long as the tube VT1 is repeatedly firing in response to the positive half cycles of its anode potential the motor M is receiving impulses from the positive half cycles of current flowing therethrough and is thereby intermittently accelerated. During each interval that the tube VT1 is non-conductive motor M is coasting at a substantially uniform speed and is thereby producing a counter-electromotive force which is proportional to the speed of the motor. This counter-electromotive force is applied over a circuit extending from the left brush of motor M, through resistance 27, over the anode-cathode path through the right unit of rectifier tube VT4 to the right brush of motor M and causes a drop in potential across the high resistance 27 which is included in the grid-cathode path of tube VT1 which serves to balance the signal and to render the grid of tube VT1 less positive. As the motor speeds up under the influence of the anode current, the counter-electromotive force builds up to a greater and greater value until it is sufficiently high to neutralize the grid potential supplied through the input transformer T4 from the incoming signal and to cause the grid potential to fall below the critical potential and consequently to cut off conduction through the tube. Thereupon the motor no longer being supplied with current impulses tends to slow down and the counter-electromotive force consequently decreases to a point where it is no longer sufficient to neutralize the applied positive grid potential whereupon the tube again becomes conducting. This phenomenon is repeated and results in the motor attaining a constant speed determined by the potential of the incoming signal.

At the same time positive potential is applied from the right secondary winding of transformer T4 to the grid of tube VT1 and the motor M is thereby caused to operate, the potential impressed upon the secondary winding S4 of transformer T2 is in phase so that the signal voltage on the left secondary winding of transformer T4 is added to the normal biasing voltage and applied to condenser C2 over a path which may be traced from the upper terminal of the left secondary winding of transformer T4, over the winding of rheostat R2 and the slider thereof, over the anode-cathode path of the right unit of rectifier tube VT3, through condenser C2 to the lower terminal of the left secondary winding of transformer T4. At the same instant the back electromotive force generated by the motor is applied from the left brush of the motor, assumed under this circumstance to be the positive brush through the secondary winding S2 of transformer T2 to the anode of tube VT2. Thus a possibility is created that during the half cycles of the alternating current source connected between terminals 21 and 22 when positive potential is applied to the anode of tube VT2 from the secondary winding S2 of transformer T2, that an increased positive potential (the sum of the potential impressed through the winding of transform er T2 and the back electromotive force of the motor M) would be applied to the anode of tube VT2 sufficient to cause its operation. To insure that this increase in potential will not be effective to falsely operate the tube VT2, negative potential from condenser C2 which has been previously charged to substantially the signaling potential plus the biasing potential and which charge is trapped in the condenser during the preceding interval in which the tube VT1 was operating, is now maintained and applied as an increased negative biasing potential upon the grid of tube VT2. With this augmented biasing potential now applied to the grid of tube VT2 it cannot become conducting even though its anode potential has been substantially increased.

Due to the relatively slow discharge of either condenser C1 or C2 through their associated resistances 27 and 28, this high bias is maintained for more than one cycle of the alternating current potential so that changing from a negative to a positive potential or vice versa, if the signal is not in exact phase, the high negative bias will prevent false firing of the tube which should not fire. For instance, under the above-mentioned condition when tube VT1 is firing to operate the motor, condenser C2 will impress a higher normal negative bias on the grid of tube VT2 so that if the anode potential on tube VT2 leads the signal voltage by a small amount, tube VT2 will not fire falsely even though its anode potential becomes positive while the signal potential on the grid of tube VT2 is still positive. This is a distinct feature of the invention attained as a result of providing the high negative bias on the tube not firing to prevent its firing on the higher anode potential due to the summation of the normal anode potential and the counter-electromotive force. It should be noted that this high negative bias is obtained from the condenser associated with the tube not firing since the charge in the condenser of the tube which is firing remains about normal since the signal potential applied to the grid of this tube is almost exactly neutralized by the counter-electromotive force of the motor.

During the half cycles of the signaling current when negative potentials are impressed upon the secondary windings of the transformer T4 harmonics of the signaling potential may be present and if the circuit is very closely biased for increased sensitivity they may be of sufficient intensity to falsely fire either tube VT1 or VT2. However, these frequencies will always be double, triple, etc., the fundamental frequency so there will always be a positive peak of the harmonics in phase with or nearly in phase with the biasing alternating current so the charge on the condenser C1 or C2 will be slightly increased if the harmonic is present and by an amount which will offset the harmonic signal when it is positive again during the next half cycle of the fundamental. This might be referred to as a self-biasing operation since the harmonic impressed will create a slight increase in the negative bias to neutralize the same harmonic acting as a signal to fire the tube. This permits a very sensitive adjustment of the bias for the signal so that a very small signal will be recognized.

It will be assumed that a change occurs in one or both of the circuits with which the potentiometers P4 and P are associated resulting, for example, in the movement of the brush of potentiometer P4 in a clockwise direction but that the brush of potentiometer P5 is not moved. It will further be assumed that in the new position of brush P4 the potential of phase $\phi 1$ still predominates and is impressed over a circuit through the lower portion of the secondary winding of transformer T1, through the lower portion of the winding of potentiometer P4 and over the brush thereof, through resistance A1, through the primary winding of input transformer T4, and through condenser C3 to ground. This potential, however, is reduced from its former value. The predominating potential of phase $\phi 1$ applied over the circuit extending over the lower portion of the secondary winding of transformer T1, through the lower portion of the winding of potentiometer P5 and the brush thereof, through resistance A2 and thence as traced through the primary winding of transformer T4 to ground is, however, unchanged.

It will be recalled that in the previous setting of the brush of potentiometer P1 to secure a balance a predominating potential of phase $\phi 2$ sufficient to balance the potentials applied through potentiometers P4 and P5 was supplied through the primary winding of transformer T4. Therefore with the new setting of potentiometer P4 potential of phase $\phi 2$ applied to the primary winding of transformer T4 from potentiometer P1 unbalances the potential of phase $\phi 1$ applied through such transformer winding and potential of phase $\phi 2$ is now effective at the primary winding of transformer T4. Therefore during the half cycles when impulses of positive potential are generated in the secondary windings of transformer T4, negative impulses of anode potential will be impressed from the secondary winding S1 of transformer T2 upon the anode of tube VT1 and positive impulses of anode potential will be impressed from the secondary winding S2 of transformer T2 upon the anode of tube VT2.

Tube VT1 will therefore not become conducting but tube VT2 will become conducting and establish a circuit through the rotor winding of motor M extending through the secondary winding S2 of transformer T2, over the anode-filament path through the tube VT2, over the filament heating circuit of the tube to the mid-point of the middle secondary winding of transformer T3, through the rotor winding of motor M and returning to the secondary winding S2 of transformer T2. The motor is now caused to operate in a direction of rotation opposite to that in which it previously rotated and to rotate the brushes of potentiometers P1, P2 and P3 and the brush of variable autotransformer V1 in a counter-clockwise direction. The brush of potentiometer P1 now moving in a counter-clockwise direction decreases the predominant potential of phase $\phi 2$ applied through the primary winding of transformer T4 until it reaches a value which is equal but opposite in phase to the sum of the potentials applied through the transformer winding over the potentiometers P4 and P5.

As the potential applied over potentiometer P1 decreases the potential impressed by the primary winding of transformer T4 upon the secondary windings thereof decreases resulting in a decrease in the rate of firing of tube VT2 whereupon motor M gradually slows down and comes to rest when the brush of potentiometer P1 has been moved to a point where the potential applied thereover through the primary winding of transformer T4 balances the potentials applied over the brushes of potentiometers P4 and P5 through such primary windings.

In the manner previously described the counter-electromotive force generated by the motor M is now applied in the reverse direction through the rotor winding of the motor, the right brush of the motor now becoming the positive brush, through the secondary winding S1 of transformer T2 to the anode of tube VT1 whereby when positive potential is applied to the anode of such tube from the secondary winding S1 of transformer T2 this potential is substantially increased by the added counter-electromotive force of the motor. At this time, however, this increased anode potential will not be effective to fire the tube VT1 since negative potential from condenser C1 which has been previously charged to substantially the signaling potential plus the biasing potential and which charge has been trapped on the condenser during the preceding half cycle interval during which the tube VT2 was operating, is now maintained and applied as an increased negative biasing potential upon the grid of tube VT1. With this increased biasing potential now applied to the grid of tube VT1 it cannot become conducting even though its anode potential has been substantially increased.

The back electromotive force generated by the motor M is also applied from its right positive brush through resistance 28 and over the anode-cathode path through the left unit of the rectifying tube VT4 back to the motor. This electromotive force causes a drop in potential across the high resistance 28 which is included in the grid to cathode path of tube VT2 which serves to provide an automatic control of the tube VT2 to operate the motor at a speed consonant with the instant value of the incoming signal potential in the manner previously described.

As previously described, condensers C1 and C2 are effective during the intervals between impulses when the signal potential is passing through zero to apply their charges to the grids of tubes VT1 and VT2 whereby the grid of the tube not firing, in this case tube VT1, is maintained at a substantially increased potential to prevent it from firing falsely due to small out-of-phase relationship between the signaling and anode potentials.

What is claimed is:

1. In a motor control circuit, a first source of alternating current, a motor, two electronic tubes for establishing the circuit of said motor, means for simultaneously applying potentials of opposite polarity from said source to the anodes of said tubes, a grid biasing circuit for each of said tubes comprising a condenser and a rectifier, said rectifiers being so connected to said source that the condenser of the biasing circuit of each tube is charged during the intervals when negative potential is being applied to the anode of the associated tube whereby said stored potential is available to maintain a normal negative bias on the grid thereof, a source of signaling potential, means for applying said signaling potential through said rectifiers to charge said condensers to potentials equal to the sum of the normal biasing potential and the signaling potential, and means for applying said signaling potential to the grids of said tubes whereby during the positive half cycles of said signaling potential that one of said tubes whose anode is positive at the same instants will become conducting to cause the rotation of said motor in one direction, said increased charge on the condenser associated with the tube not firing being available to more negatively bias the grid of said tube to prevent it from firing falsely should the potential on the anode of such tube be slightly out of phase with the signaling potential.

2. In a motor control circuit, a first source of alternating current, a motor, two electronic tubes for establishing the circuit of said motor, means for simultaneously applying potentials of opposite polarity from said source to the anodes of said tubes, a grid biasing circuit for each of said tubes comprising a condenser and a rectifier, said rectifiers being so connected to said source that the condenser of the biasing circuit of each tube is charged during the intervals when negative potential is being applied to the anode of the associated tube whereby said stored potential is available to maintain a normal negative bias on the grid thereof, a source of signaling potential, means for applying said signaling potential through said rectifiers to charge said condensers to potentials equal to the sum of the normal biasing potential and the signaling potential, means for applying said signaling potential to the grids of said tubes whereby during the positive half cycles of said signaling potential that one of said tubes whose anode is positive at the same instants will become conducting to cause the rotation of said motor in one direction, said increased charge on the condenser associated with the tube not firing being available to more negatively bias the grid of such tube to prevent it from firing falsely should the potential on the anode tube be slightly out of phase with the signaling potential, and resistances in bridge of said condensers for dissipating the charges on said condensers to the normal biasing potential when no signaling potential is present.

3. In a motor control circuit, a first source of alternating current, a motor, two electronic tubes for establishing the circuit of said motor, means for simultaneously applying potentials of opposite polarity from said source to the anodes of said tubes, a grid biasing circuit for each of said tubes comprising a condenser and a rectifier, said rectifiers being so connected to said source that the condenser of the biasing circuit of each tube is charged during the intervals when negative potential is being applied to the anode of the associated tube whereby such stored potential is available to maintain a normal negative bias on the grid thereof, a source of signaling potential, means for applying said signaling potential through said rectifiers to charge said condensers to potentials equal to the sum of the normal biasing potential and the signaling potential, and means for applying said signaling potential to the grids of said tubes whereby during the positive half cycles of said signaling potential that one of said tubes whose anode is positive at the same instants will become conducting to cause the rotation of said motor in one direction, said increased charge on the condenser associated with the tube not firing being available to more negatively bias the grid of such tube to prevent it from firing falsely when the positive potential is applied to its anode as augmented by the counter-electromotive force generated by said motor also applied to the anode of such tube.

4. In a motor control circuit, a first source of alternating current, a motor, two electronic tubes for establishing the circuit of said motor, means for simultaneously applying potentials of opposite polarity from said source to the anodes of said tubes, a grid biasing circuit for each of said tubes comprising a condenser, a resistance in bridge thereof, and a rectifier, said rectifiers being so connected to said source that the condenser of the biasing circuit of each tube is charged during the intervals when negative potential is being applied to the anode of the associated tube whereby such stored potential is available to maintain a normal negative bias on the grid thereof, a source of signaling potential, means for applying said signaling potential to the grids of said tubes whereby one of the other of said tubes will fire dependent on the phase correspondence of its anode potential with the signaling potential to cause the rotation of said motor in one or the other direction, and means for applying the counter-electromotive force generated by said motor across the resistance associated with the biasing circuit of the fired tube to oppose the signaling potential applied to the grid of said tube and to thereby control the speed of firing of said tube and the speed of rotation of said motor.

5. In a motor control circuit, a first source of alternating current, a motor, two electronic tubes for establishing the circuit of said motor, means for simultaneously applying potentials of opposite polarity from said source to the anodes of said tubes, a grid biasing circuit for each of said tubes comprising a condenser, a resistance in bridge thereof, and a rectifier, said rectifiers being so connected with said source that the condenser of the biasing circuit of each tube is charged during the intervals when negative potential is being applied to the anode of the associated tube whereby such stored potential is available to maintain a normal negative bias on the grid thereof, a source of signaling potential, means for applying said signaling potential to the grids of said tubes whereby one or the other of said tubes will fire dependent upon the phase correspondence of its anode potential with the signaling potential to cause the rotation of said motor in either one or the other direction, and oppositely poled rectifying means for applying the counter-electromotive force generated by said motor across the resistance associated with the biasing circuit of the fired tube to oppose the signaling potential applied to the grid of said tube and to thereby control the speed of firing of said tube and the speed of rotation of said motor.

6. In a motor control circuit, a first source of alternating current, a motor, two electronic tubes for establishing the circuit of said motor, means for simultaneously applying potentials of opposite polarity from said source to the anodes of said tubes, a grid biasing circuit for each of said tubes comprising a condenser, a resistance in bridge thereof, and a rectifier, said rectifiers being so connected with said source that the condenser of the biasing circuit of each tube is charged during the intervals when negative potential is being applied to the anode of the associated tube whereby such stored potential is available to maintain a normal negative bias on the grid thereof, a source of signaling potential, means for applying said signaling potential to said rectifiers to charge one or the other of said condensers to a potential equal to the sum of the normal biasing potential and the signaling potential, means for applying said signaling potential to the grids of said tubes whereby one or the other of said tubes will fire dependent upon the phase correspondence of the positive half cycles of its anode potential with the positive half cycles of the signaling potential to cause the rotation of said motor in one or the other direction, and oppositely poled rectifying means for applying the counter-electromotive force generated by said motor across the resistance associated with the biasing circuit of the fired tube to oppose the signaling potential applied to the grid of said tube and to the associated condenser to thereby control the speed of firing of said tube and the speed of rotation of said motor, and whereby the charge on the condenser associated with the fired tube is not increased by said signaling potential.

7. In a motor control circuit, a first source of alternating current, a motor, two electronic tubes for establishing the circuit of said motor, means for simultaneously applying potentials of opposite polarity from said source to the anodes of said tubes, a grid biasing circuit for each of said tubes comprising a condenser and a rectifier, said rectifiers being so connected to said source that the condenser of the biasing circuit of each tube is charged during the intervals when negative potential is being applied to the anode of the associated tube whereby such stored potential is available to maintain a normal negative bias on the grid thereof, a source of signaling potential, means for applying said signaling potential to the grids of said tubes whereby during positive half cycles of said signaling potential that one of said tubes whose anode is positive at the same instants will become conducting to cause the rotation of said motor in one direction, and means for applying the positive peaks of the harmonics of each negative half cycle of said signaling potential to said condensers whereby the potentials thereon are increased to increase the negative bias of said tubes sufficiently to offset the harmonics of the signal when they again become positive during the succeeding half cycles of the fundamental signaling potential.

WALTER P. ALBERT.

REFERENCES CITED

The following references are of record in the file of this patent:

UNITED STATES PATENTS

| Number | Name | Date |
|---|---|---|
| 2,085,128 | Staege | June 29, 1937 |
| 2,085,595 | Livingston | June 29, 1937 |
| 2,174,386 | King | Sept. 26, 1939 |
| 2,288,295 | Moyer et al. | June 30, 1942 |
| 2,325,092 | Andrews | July 27, 1943 |
| 2,352,626 | Grabau | July 4, 1944 |
| 2,448,025 | Grabau | Aug. 31, 1948 |